United States Patent

Tam

[11] Patent Number: 5,677,483
[45] Date of Patent: Oct. 14, 1997

[54] SIDEWALL PLUNGING TIRE AIR PRESSURE GAUGE

[76] Inventor: Isaac Y. Tam, 470 Americano Way, Fairfield, Calif. 94533

[21] Appl. No.: 685,023

[22] Filed: Jul. 22, 1996

[51] Int. Cl.⁶ .................................................. B60C 23/02
[52] U.S. Cl. .................................................. 73/146.8
[58] Field of Search ........................ 73/146.2, 146.3, 73/146.8; 116/34 R, 34 A, 34 B; 137/224, 226, 229, 227

[56] References Cited

U.S. PATENT DOCUMENTS

| | | | |
|---|---|---|---|
| 3,592,218 | 7/1971 | Guy et al. | 73/146.8 |
| 3,824,849 | 7/1974 | Foxhall | 73/146.8 |
| 4,072,048 | 2/1978 | Arvan | 73/146.8 |
| 4,574,629 | 3/1986 | Weng | 73/146.8 |

*Primary Examiner*—Richard Chilcot
*Assistant Examiner*—William L. Oen

[57] ABSTRACT

A tire air pressure gauge that measures air pressure without connecting to the inside of the tire is disclosed. It generally consists of four parts: a handle, a plunger, a spring, and an indicator bar. The plunger is retractably mounted in the handle through the spring. The indicator bar is also slidably mounted on the handle. When plunged against the side wall of a tire, the plunger will retract, and will push the indicator bar outward. The amount of the portion of the indicator bar that is pushed out, indicates how high the air pressure inside the tire is. The more the indicator bar is pushed out, the higher the air pressure inside the tire.

2 Claims, 2 Drawing Sheets

SIDEWALL PLUNGING TIRE AIR PRESSURE GAUGE

BACKGROUND—FIELD OF INVENTION

The present invention is related to tire air pressure gauges for measuring air pressure of pneumatic tires.

BACKGROUND—PRIOR ART

Heretofore tire air pressure gauges measure tire air pressure by tapping into the inside of the tires so that the high pressure area inside the tire is pneumatically connected to the measuring gauge. To obtain accurate measurements under this arrangement, the gauge must be tightly pressed against the tire stem in an exactly lined up position, otherwise, leakage of air will occur, the resulting reading of pressure will not be accurate, and after a few tries, due to the leakage of air, the pressure inside the tire will likely be a lot lower than the original pressure.

To a lot of people, measuring tire pressure is a very bothersome and difficult, if not impossible, task. A lot of tires are left unchecked for weeks and months due to the apprehension of the chore. As a result, tires are damaged, vehicular performances suffer, and accidents occur.

OBJECTS AND ADVANTAGES

The object of the present invention is to provide a tire air pressure gauge that is extremely easy to use, so that measuring tire pressure is extremely simple and quick.

Another object of the invention is to provide a tire air pressure gauge that does not tap into the inside of the tire, thus air leakage will never occur due to the performing of air pressure measurement.

Still another object of the invention is to provide a tire air pressure gauge that does not require much skill to operate. All that needs to be done is to point and punch.

SUMMARY OF THE INVENTION

The tire air pressure gauge of the invention does not pneumatically connect to the inside of the tire. It measures the pressure by measuring the degree of retraction of a plunger when plunged onto the side wall of a tire under certain conditions.

The gauge basically consists of 4 parts: a handle, a plunger, a spring, and an indicator. The plunger is slidably mounted on the handle through the spring. The indicator is also slidably mounted on the handle to measure the distance of retraction of the plunger.

When pressed against the side wall of a tire, the handle through the spring, forces the plunger to plunge the tire wall. The plunger will cause the side wall to deflect. And at the same time the plunger will retract into the handle against the force of the spring. The distance of retraction of the plunger is related to the depth of deflection of the side wall of the tire. The depth of deflection of the tire wall is also related to the air pressure inside the tire. Hence the air pressure of the tire is related to the distance of retraction of the plunger. The higher the pressure, the more retraction of the plunger, and vice versa. By measuring the distance of retraction of the plunger, the indicator gives the reading of the air pressure inside the tire.

DETAILED DESCRIPTION OF THE INVENTION

Figure 1:
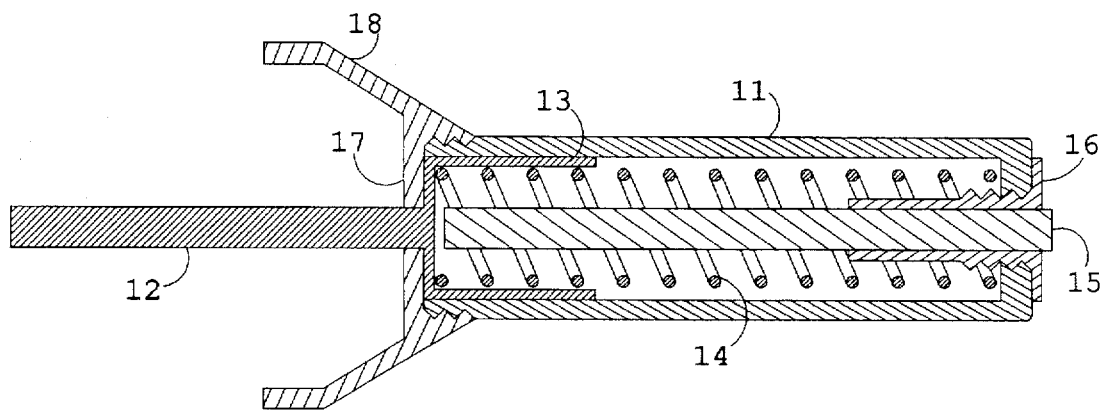
FIG. 1 is a longitudinal section of the first preferred embodiment, showing the embodiment in a condition when it is not being used.
Figure 2:
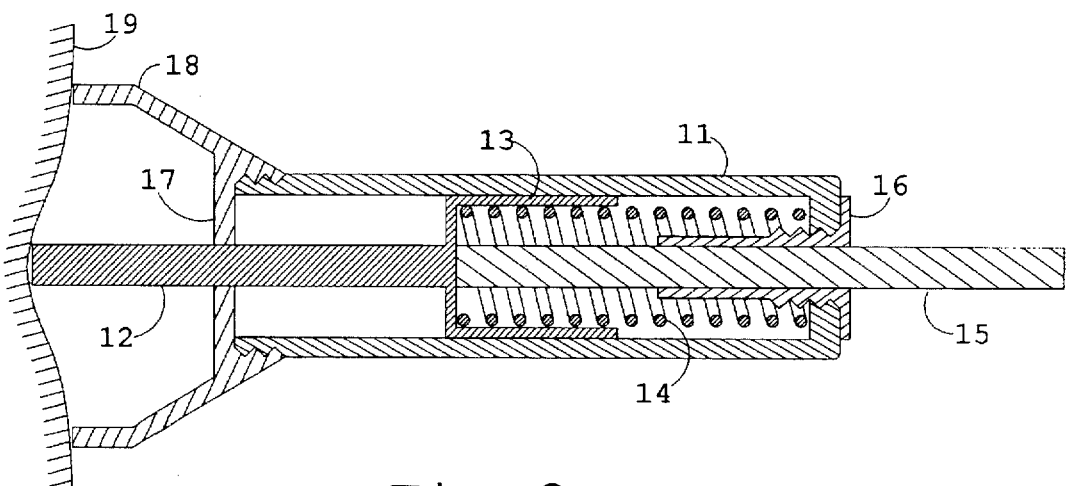
FIG. 2 is a longitudinal section of the first preferred embodiment, showing the embodiment in a condition when it is being used to check the air pressure of a tire.

FIG. 1 and FIG. 2 are longitudinal sections of a preferred embodiment of the invention, wherein FIG. 1 shows the embodiment in a condition when it is not being used, and FIG. 2 shows the embodiment in a condition when it is pressed all the way against the side wall of a tire to measure the air pressure inside the tire. In FIG. 1 and FIG. 2, 11 is a handle body, 12 is a plunger body, 13 is a plunger piston, 14 is a spring, 15 is a indicator bar, 16 is a rear bearing, 17 is a front bearing, 18 is a stopper, and 19 is the side wall of a tire.

Handle body 11 is a cylindrical housing that houses plunger piston 13, part of plunger body 12, spring 14, indicator bar 15, and rear bearing 16.

Plunger piston 13 fits snugly into handle body 11 so that it slides smoothly together with plunger body 12 longitudinally. Plunger piston 13 is fixedly connected to plunger body 12. Spring 14 is placed longitudinally between the rear end of handle body 11 around rear bearing 16, and the inner area of plunger piston 13. Spring 14 constantly pushes plunger piston 13 and plunger body 12 outward, so that plunger body protrudes outward from said handle body, and will retract inward if subjected to an inward pressure that is greater than the outward pressure of spring 14. Front bearing 17 slidably supports plunger body 12 so that plunger body 12 slides through smoothly. Front bearing 17 also serves as a front cap of handle body 11, to confine plunger piston 13 to the housing of handle body 11. Front bearing 17 extends outward and forward to form a horn-shaped stopper 18. When stopper 18 hits side wall 19 of a tire, handle body 11 can not move forward anymore, as shown in FIG. 2. This sets a predefined condition for measuring tire pressure, because every time the device is used, handle body 11 is pushed forward to travel a fixed distance before stopper 18 hits the side wall of the tire. The horn-shaped stopper 18 also serves as a spacer between the side wall 19 of the tire and the operator's hand (not shown) which holds the device by its handle body 11, for comfortable operation. Stopper 18, together with front bearing 17, is screwed onto handle body 11.

Rear bearing 16 is screwed into the rear end of handle body 11, for slidably supporting indicator bar 15, so that indicator bar 15 can slide smoothly longitudinally. Rear bearing 16 also provides certain friction to indicator bar 15, so that indicator bar 15 will not slide until it is pushed. This way indicator bar 15 will hold its position that indicates the air pressure of the tire, until it is read and pushed to reset.

When the embodiment is pushed forward against the side wall 19 of a tire as shown in FIG. 2, the side wall 19 of the tire will deflect, and plunger 12 will retract against the pressure of spring 14. As plunger 12 retracts, plunger piston 13 pushes indicator bar 15 outward until stopper 18 hits side wall 19 of the tire. The amount of the portion of indicator bar 15 that is pushed out, indicates the amount of retraction of plunger body 12, or the air pressure of the tire. The bigger portion that is pushed out, the higher the air pressure. There are graduated markings (not shown) on the side of indicator bar 15 to give readings of the air pressure.

Figure 3:
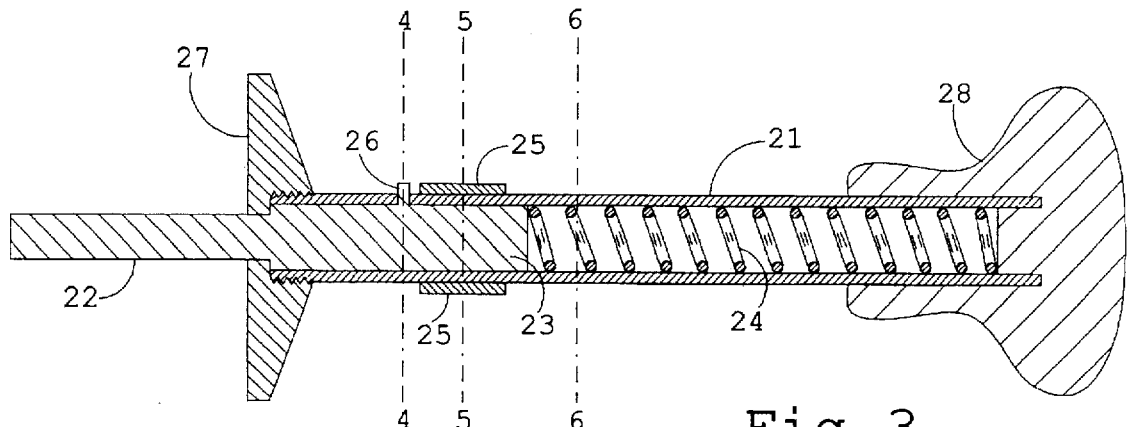
FIG. 3 is a longitudinal section of the second preferred embodiment, showing the embodiment in a condition when it is not being used.
Figure 4:
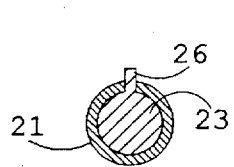
FIG. 4 is a cross section taken from line 4—4 of FIG. 3.
Figure 5:
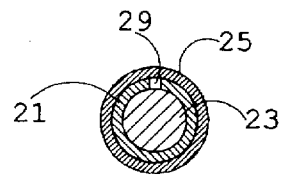
FIG. 5 is a cross section taken from line 5—5 of FIG. 3.
Figure 6:
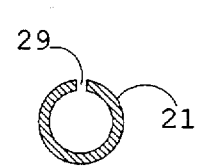
FIG. 6 is a cross section taken from line 6—6 of FIG. 3.
Figure 7:
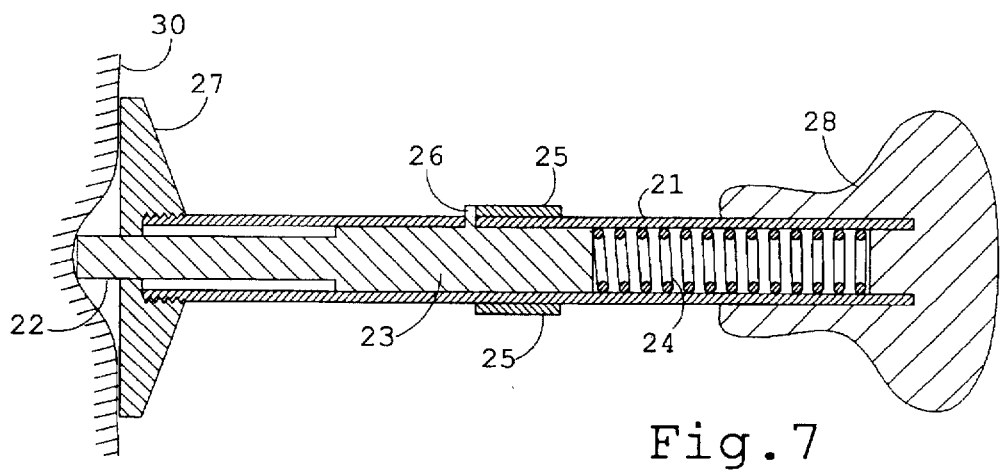
FIG. 7 is a longitudinal section of the second preferred embodiment, showing the embodiment in a condition when it is being used to check the air pressure of a tire.

FIG. 3, FIG. 4. FIG. 5, FIG. 6, and FIG. 7 show another preferred embodiment of the invention, wherein FIG. 3 is a longitudinal section that shows the embodiment in a condition when it is not being used, FIG. 4 is a cross section taken from line 4—4 of FIG. 3, FIG. 5 is a cross section taken from line 5—5 of FIG. 3, FIG. 6 is a cross section taken from line 6—6 of FIG. 3, and FIG. 7 is a longitudinal section that shows the embodiment in a condition when it is pressed all the way against the side wall of a tire to measure the air pressure inside the tire.

In FIG. 3 through FIG. 7, 21 is a cylindrical plunger holder, 22 is a plunger body, 23 is a plunger piston, 24 is a spring, 25 is a marker ring, 26 is a pusher rod, 27 is a stopper, 28 is a handle, 29 is a longitudinal slit on cylindrical plunger holder 21 for pusher rod 26 to go through, 30 is the side wall of a tire.

Plunger piston 23 is snugly fitted into cylindrical plunger holder 21 so that together with plunger body 22, it slides smoothly along cylindrical plunger holder 21 longitudinally. Plunger piston 23 is fixedly connected to plunger body 22. Spring 24 is mounted inside plunger holder 21 in between plunger piston 23, and the rear end of plunger holder 21. Spring 24 constantly pushes plunger piston 23 and plunger body 22 outward to the front, so that plunger body 22 protrudes outward from plunger holder 21, and will retract inward when subjected to an inward pressure that is greater than the outward pressure of spring 24. Stopper 27 is screwed onto the front end of plunger holder 21, to stop the forward movement of plunger holder 21 when stopper 27 hits side wall 30 of the tire, as indicated in FIG. 7. Stopper 27 also serves as a bearing for slidably supporting plunger body 22, so that plunger body 22 is held in place, and can slide in and out of plunger holder smoothly. Stopper 27 further serves as a cap for confining plunger piston 23 to the housing of plunger holder 21. Handle 28 is mounted on the rear end of plunger holder 21. Handle 28 also serves as a cap to confine spring 24 to the housing of plunger holder 21.

Pusher rod 26 is fixedly mounted on plunger piston 23, and is fitted into longitudinal slit 29 on plunger holder 21. When plunger piston 23 slides longitudinally within plunger holder 21, pusher rod 26 slides along longitudinal slit 29. Marker ring 25 is a ring-shaped marker slidably mounted on the outer surface of plunger holder 21 between pusher rod 26 and handle 28. There is certain friction between plunger holder 21 and marker ring 25, so that marker ring 25 does not slide until pushed.

When, by the handle 28, a user pushes the embodiment against the side wall 30 of a tire, side wall 30 will deflect, and plunger body 22 will retract into plunger holder 21 against the pressure of spring 24, as shown in FIG. 7. This process keeps on going until stopper 27 hits side wall 30 of the tire. At the same time, pusher rod 26 will push marker ring 25 toward handle 28. The distance traveled by marker ring 25 indicates the amount of retraction of plunger body 22, or the air pressure inside the tire. The farther the maker ring 25 travels, the higher the pressure. There are graduated markings (not shown) on the outer surface of plunger holder 21 to indicate how far marker ring 25 has traveled, or how far plunger body 22 has traveled, and hence how high the air pressure inside the tire is.

Hence the reader can see this is a novel device for checking tire air pressure quickly and easily without tapping into the inside of the tire.

While my above description contains many specificities, these should not be construed as limitations on the scope of the invention, but rather as an exemplification of a few preferred embodiments thereof. Many other variations are possible. Accordingly, the scope of the invention should be determined not by the embodiments illustrated, but by the appended claims and their legal equivalents.

What is claimed is:

1. A sidewall plunging tire air pressure gauge comprising:

a) a handle means;

b) a plunger means protrudingly and retractably mounted on said handle means;

c) a spring means mounted on said handle means for pushing said plunger means outward;

d) an indicator means mounted on said handle means for indicating the amount of retraction of said plunger means;

e) a stopper means mounted on said handle means for stopping the movement of said handle means when said stopper means hits the sidewall of a tire.

2. A sidewall plunging tire air pressure gauge comprising:

a) a plunger holder means;

b) a handle means mounted on said plunger holder means;

c) a plunger means protrudingly and retractably mounted on said plunger holder means;

d) a spring means mounted inside said plunger holder means, for pushing said plunger means outward;

e) an indicator means mounted on said plunger holder means, for indicating the amount of retraction of said plunger means;

f) a stopper means mounted on said plunger holder means, for stopping the movement of said plunger holder means when said stopper means hits the side wall of a tire.

* * * * *